United States Patent [19]
Fromm

[11] Patent Number: 5,490,535
[45] Date of Patent: Feb. 13, 1996

[54] VALVE FOR CONTROLLING A FLUID MEDIUM FLOWING UNDER PRESSURE

[75] Inventor: Alfred Fromm, Reutlingen, Germany

[73] Assignee: Bebro-Electronic Bengel & Bross GmbH, Frickenhausen, Germany

[21] Appl. No.: 325,312

[22] PCT Filed: Apr. 9, 1993

[86] PCT No.: PCT/EP93/00876

§ 371 Date: Oct. 24, 1994

§ 102(e) Date: Oct. 24, 1994

[87] PCT Pub. No.: WO93/22590

PCT Pub. Date: Nov. 11, 1993

[30] Foreign Application Priority Data

Apr. 27, 1992 [DE] Germany ............... 42 13 809.4

[51] Int. Cl.$^6$ ............... F16K 31/44; F16K 3/24; F16K 1/12
[52] U.S. Cl. ............... 137/219; 251/282; 251/333
[58] Field of Search ............... 137/219; 251/333, 251/343, 282

[56] References Cited

U.S. PATENT DOCUMENTS

| | | |
|---|---|---|
| 2,010,416 | 8/1935 | Schlagenhauff . |
| 3,654,950 | 4/1972 | Hamm ............... 137/219 |

FOREIGN PATENT DOCUMENTS

| | | |
|---|---|---|
| 1065785 | 9/1959 | Germany . |
| 1206246 | 12/1965 | Germany . |
| 245937 | 5/1987 | Germany . |
| 2-118278 | 5/1990 | Japan . |

*Primary Examiner*—Gerald A. Michalsky
*Attorney, Agent, or Firm*—Shenier & O'Connor

[57] ABSTRACT

A valve 1 for controlling a fluid medium flowing under pressure comprises an inlet opening 6 and an outlet opening 12 as well as an inlet member 4 having the medium flowing axially therethrough and a sleeve-shaped control member 13 axially displaceable between a closed and an open position relative to the inlet member 4, whereby in the closed position the outlet opening 12 is closed and in the open position the outlet opening 12 is opened. In addition, a first radially projecting, elastic sealing ring 24b is provided and a first annular sealing edge 25 which is adapted to be pressed sealingly against the first sealing ring 24b in a closed position of the control member 13. The displaceable control member 13 is enclosed by a valve housing 2 and the space between control member 13 and valve housing 2 is acted upon by the fluid medium flowing under pressure so that essentially no resulting pressure in axial direction is present at the control member and therefore the control member 13 is displaceable without any appreciable expenditure of force. A second radially projecting, elastic sealing ring 26b is provided in axial spaced relation to the first sealing ring 24b. A second annular sealing edge 27 is adapted to be pressed sealingly against the second sealing ring 26b in a closed position of the control member 13.

13 Claims, 7 Drawing Sheets

VALVE FOR CONTROLLING A FLUID MEDIUM FLOWING UNDER PRESSURE

The invention relates to a valve for controlling a fluid medium flowing under pressure, comprising inlet openings and outlet openings, an inlet member having the medium flowing axially therethrough, a sleeve-shaped control member axially displaceable between a closed and an open position in relation to the inlet member, a first radially projecting, elastic sealing ring and a first annular sealing edge which is adapted to be pressed sealingly against the first sealing ring in the closed position of the control member, whereby the displaceable control member is enclosed by a valve housing and the space between the control member and valve housing is acted upon with the fluid medium flowing under pressure so that essentially no resulting pressure in axial direction is present at the control member and therefore the control member is displaceable without any appreciable expenditure of force, a second radially projecting, elastic sealing ring is provided in axial spaced relation to the first sealing ring and a second annular sealing edge is adapted to be pressed sealingly against the second sealing ring in the closed position of the control member.

A valve of this type is known from U.S. Pat. No. 3,654,950. The first and second sealing rings provided therein are U-shaped and formed from a flexible material with two legs, between which a spring is inserted. Shortly before reaching the closed position, the one leg is pressed forcibly against one of the first and second annular sealing edges due to a differential pressure. As a result of this strong pressing action, there is, of necessity, a relatively large areal contact between sealing ring and sealing edge so that a relatively large force must be applied when opening the valve.

When such valves are used in mining and underground workings, they are controlled and supplied from a central control device via data lines which are known per se. Since only small electrical currents ought to flow in these data lines in view of a possible risk of explosion, the supply to the valves presupposes a low intrinsic current requirement and therefore as small an actuating force, in particular opening force, as possible. The known valve does, however, have a high intrinsic current requirement due to the large opening force required.

The object of the invention is to improve a valve of the generic type such that it is easy to open with a more or less infinitesimal expenditure of force, whereby the valve is also intended to allow, in particular, the control of fluid media flowing under very high pressure.

The object is accomplished by the invention, in a valve of the generic type, in that the first and second annular sealing edges are designed to be relatively sharp and like knife edges and in a closed position of the valve form a sealing region in the form of a circular line between the first and second sealing rings, on the one hand, and the first and second sealing edges, on the other hand.

The following description comprising the preferred embodiments of the invention serves to explain the invention further in conjunction with the attached drawings.

Figure 1:
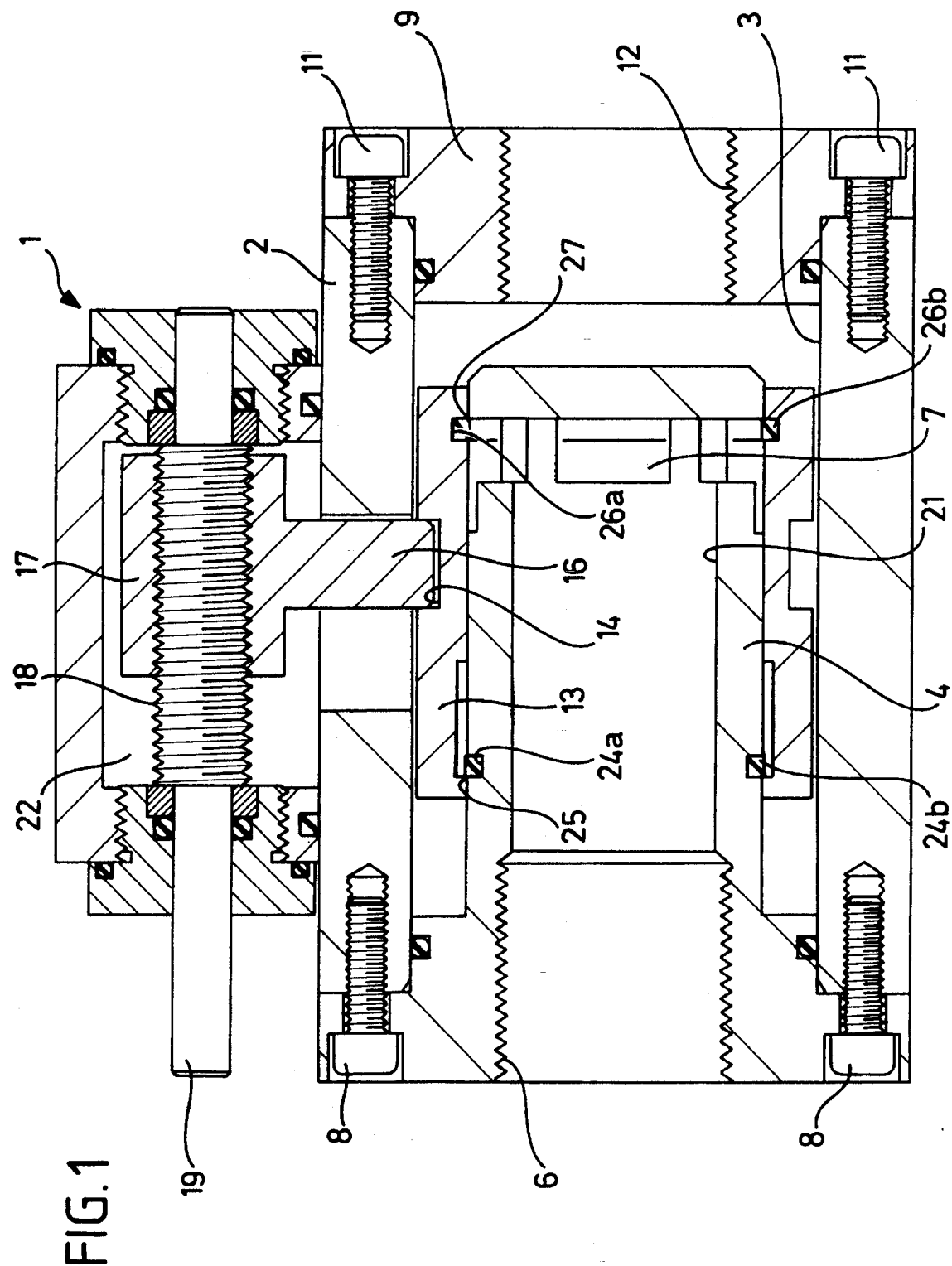
FIG. 1 is a sectional illustration of an inventive valve for controlling a fluid medium flowing under pressure in a closed position.

A valve 1 illustrated in FIG. 1 in a closed position has a valve housing 2, preferably made of metal, in which an axial valve bore 3 is located. A tubular, likewise preferably metal inner or inlet member 4 is arranged in the valve bore 3 and an inlet opening 6 provided with a thread is provided at one end of this inlet member and open outlet regions 7 are arranged at its other end. The tubular inlet member 4 is rigidly and sealingly connected to the valve housing 2 by means of screws 8. In addition, a cover plate 9 is secured to the valve housing 2 by means of screws 11 and an outlet opening 12 likewise provided with a thread is located in this cover plate.

The tubular inlet member 4 is surrounded by a sleeve-shaped outer or control member 13, preferably made of metal, which is arranged for axial displacement on the tubular inlet member 4.

A groove 14 is arranged in the outer circumference of the sleeve-shaped control member and a projection 16 engages in this groove as drive member. The projection 16 is connected in one piece to a nut 17 which fits onto a threaded rod 18. A shaft 19 is rigidly connected to the threaded rod 18. Rotation of this shaft causes an axial movement of the nut 17 and the projection 16 so that the sleeve-shaped control member 13 is displaced axially in relation to the tubular inlet member 4 and, thus, the valve 1 is switched from its closed into its open position and vice versa. A small electromotor which is not illustrated and has a low current consumption can, for example, be connected to the shaft 19. It is also possible to actuate the valve 1 by hand.

The entire interior space 21 of the valve (valve bore 3), including the space 22, in which the threaded rod 19 with the associated nut 17 are located, is constantly filled—in particular in the open position—with the fluid medium under pressure, e.g. water, oil or the like. In this way, the sleeve-shaped control member 13 is entirely enclosed by medium under pressure and can be displaced relative to the inlet member 4 more or less without any expenditure of force.

In the closed position of the valve 1 shown in FIG. 1, the inlet opening 6 is sealingly closed in relation to the outlet opening 12. The sleeve-shaped control member 13 is pushed into the closed position on the tubular inner member 4—to the right in FIG. 1.

Figure 2:
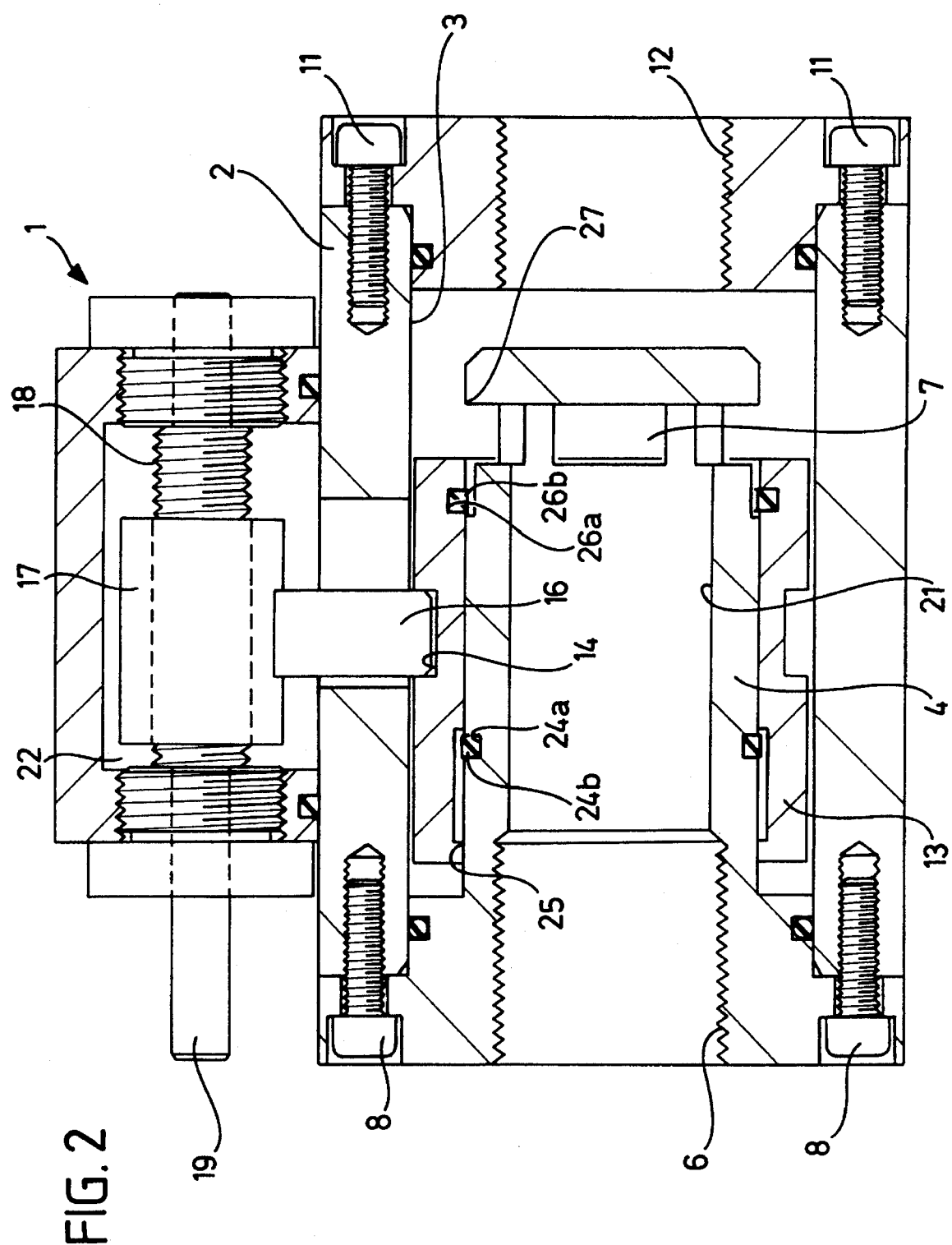
FIG. 2 is a sectional illustration of the valve from FIG. 1 in an open position.

In FIG. 2, the valve 1 is illustrated in its open position so that the fluid medium under pressure passes from the inlet opening 6 via the interior space 21 and the outlet regions 7 into the outlet opening 12. The sleeve-shaped control member 13 is thereby displaced along the tubular inlet member 4 into an open position—to the left in FIG. 2.

Figure 3:
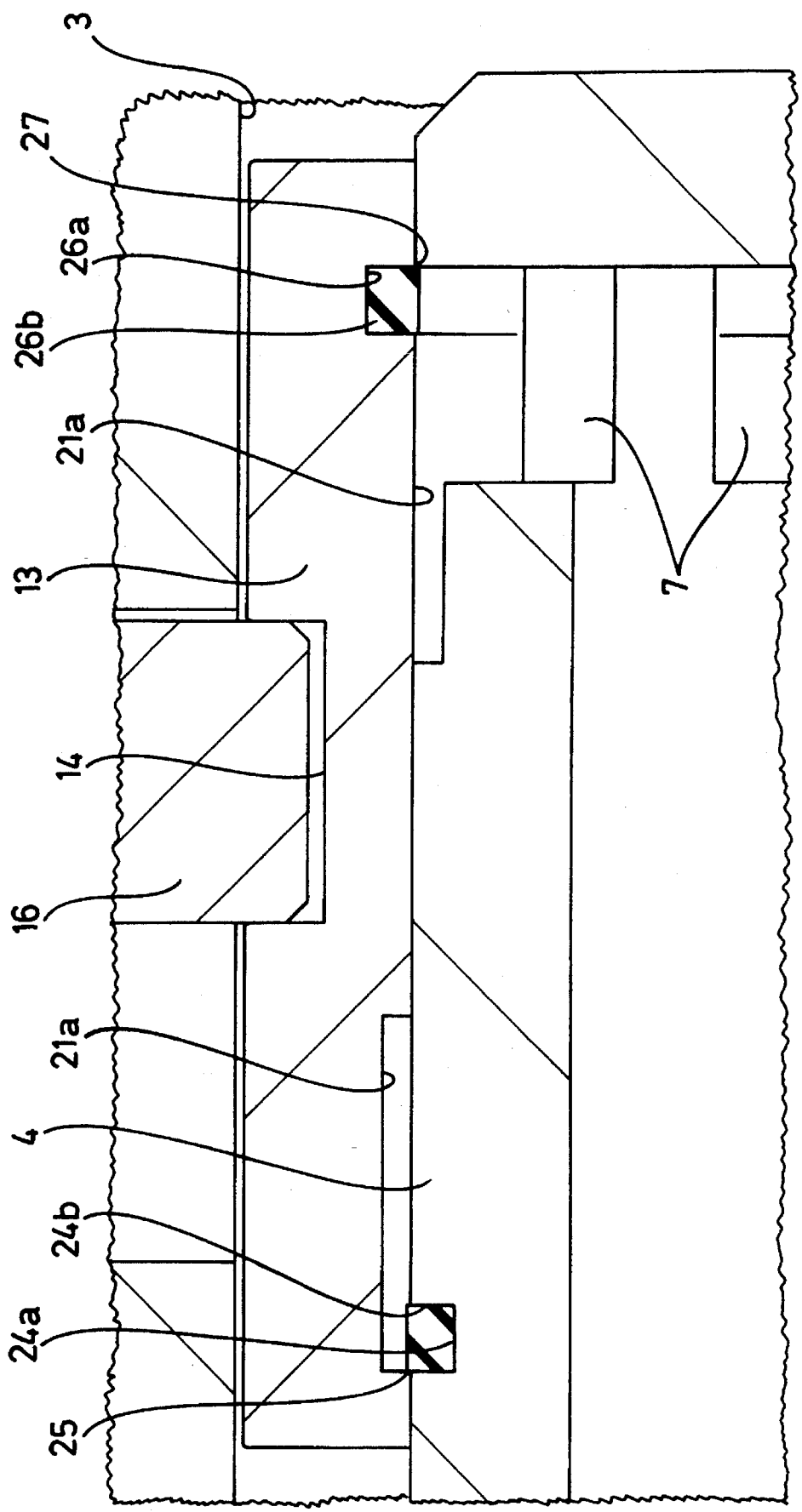
FIG. 3 is an enlarged, sectional, individual illustration of a tubular inlet member and a sleeve-shaped control member axially displaceable thereon in a closed position.

FIG. 3 shows an enlarged individual illustration in a sectional view of the tubular inlet member 4 and the sleeve-shaped control member 13 axially displaceable thereon in a closed position of the valve 1. An annular groove 24a is arranged at the outer circumference of the inlet member 4 and a first sealing ring 24b which projects radially somewhat beyond the outer circumference of the inlet member 4 and has an essentially rectangular or circular cross section (O-ring seal) is inserted into this groove. A first annular sealing edge 25 on the sleeve-shaped control member 13 is associated with and adjacent the groove 24a and the sealing ring 24b and in a closed position of the valve is brought into engagement on the sealing ring 24b. The groove 24a, the sealing ring 24b and the sealing edge 25 are arranged in the vicinity of the inlet opening 6 of the valve.

An annular groove 26a arranged on the inner circumferential surface of the sleeve-shaped control member 13 is located in the vicinity of the outlet opening 12 of the valve 1 and a second sealing ring 26b (O-ring seal) which projects somewhat beyond the inner circumferential surface is inserted into this groove. A second sealing edge 27 arranged in the vicinity of the groove 26a and the sealing ring 26b at the outer circumferential surface of the tubular inlet member 4 engages on the sealing ring 26b in a closed position of the valve 1 essentially at the same time as the sealing edge 25 also meets the sealing ring 24b. The sealing edges 25, 26 engage sealingly on the sealing rings 24b, 26b along circular lines, i.e. with relatively small areas. Intermediate spaces 21a are formed between the tubular inlet member 4 and the sleeve-shaped control member 13 and these spaces are filled with the fluid medium under pressure in a closed position due to the lack of a seal.

The manner in which the valve functions is apparent from FIGS. 1 and 2 in conjunction with FIG. 3. In an open position of the valve 1 (FIG. 2), the sleeve-shaped control member 13 is axially displaced relative to the tubular inlet member 4—to the left in FIG. 2—such that the first and second sealing edges 25, 27 are removed from the first and second sealing rings 24b, 26b which enables the fluid medium flowing under pressure to flow out through the outlet regions 7 and the outlet opening 12.

In a closed position (FIGS. 1 and 3), the sealing edges 25, 27 engage essentially simultaneously on the sealing rings 24b, 26b located respectively opposite them due to axial displacement of the sleeve-shaped control member 13 on the tubular inlet member 4—to the right in FIG. 2—while the medium which is located continuously in the spaces 21a, flows under pressure and surrounds the control member 13 on all sides enables the control member 13 to be displaced almost without any expenditure of force.

During the closing procedure, a pressure is built up in the spaces 21a which presses the two sealing rings 24b, 26b against the two relatively sharp, knife-like sealing edges 25, 27, whereby the sealing rings are somewhat deformed and form respective sealing regions in the form of circular lines at the sealing edges 25, 27. In addition, the sealing rings 24b, 26b are pressed against the sealing edges 25, 27 by the flowing medium due to a suction effect in the space located respectively behind them. In this position, the valve 1 does not close the inlet opening 6 in relation to the outlet opening 12.

The valve 1 can also be opened easily, i.e. without any appreciable expenditure of force, since the two sealing edges 25, 27 form at the two sealing rings 24b, 26b only respective sealing regions in the form of circular lines which can be separated from the sealing rings by means of only a small expenditure of force even at high pressures of the flowing fluid medium.

In this way, it is possible to open and close the valve with an almost infinitesimal expenditure of force. The valve 1 can, in addition, be held in a closed as well as in an opened state without any expenditure of force. Consequently, the valve can be held in the closed or opened state without any motor drive and without drive current since a servomotor required for the opening and closing need not be actuated once the open or closed position is reached. The valve is therefore operated completely "current-free" in the opened or closed state and only very small servomotors and minimal currents are necessary for the opening and closing procedure.

Instead of the sealing rings 24b, 26b with a circular cross section, sealing rings having, for example, square, semicircular, triangular or oval cross sections are also possible.

Furthermore, the sealing rings 24b, 26b which project radially somewhat beyond the tubular inlet member or beyond the sleeve-shaped control member 13 can also be replaced by plastic projections which are rigidly arranged on the inlet member 4 or the control member 13 and against which the sealing edges 25, 27 which are preferably metallic and located respectively opposite these projections come to rest.

Moreover, a good sealing effect can also be attained with two metal edges or metal surfaces which abut directly on one another when metal projections are used instead of the plastic projections.

The invention provides for a valve which can be produced with low production costs—no exact tolerances are, for example, required—, which can be directly actuated more or less without any force, which can be operated current-free in each switching position (open or closed position) and which is also sealed against very high pressures. The valve is, therefore, especially suitable for use in mining or underground workings. In addition, it is possible to use it in drinking water supply as well as in gas and compressed air systems.

Figure 4:
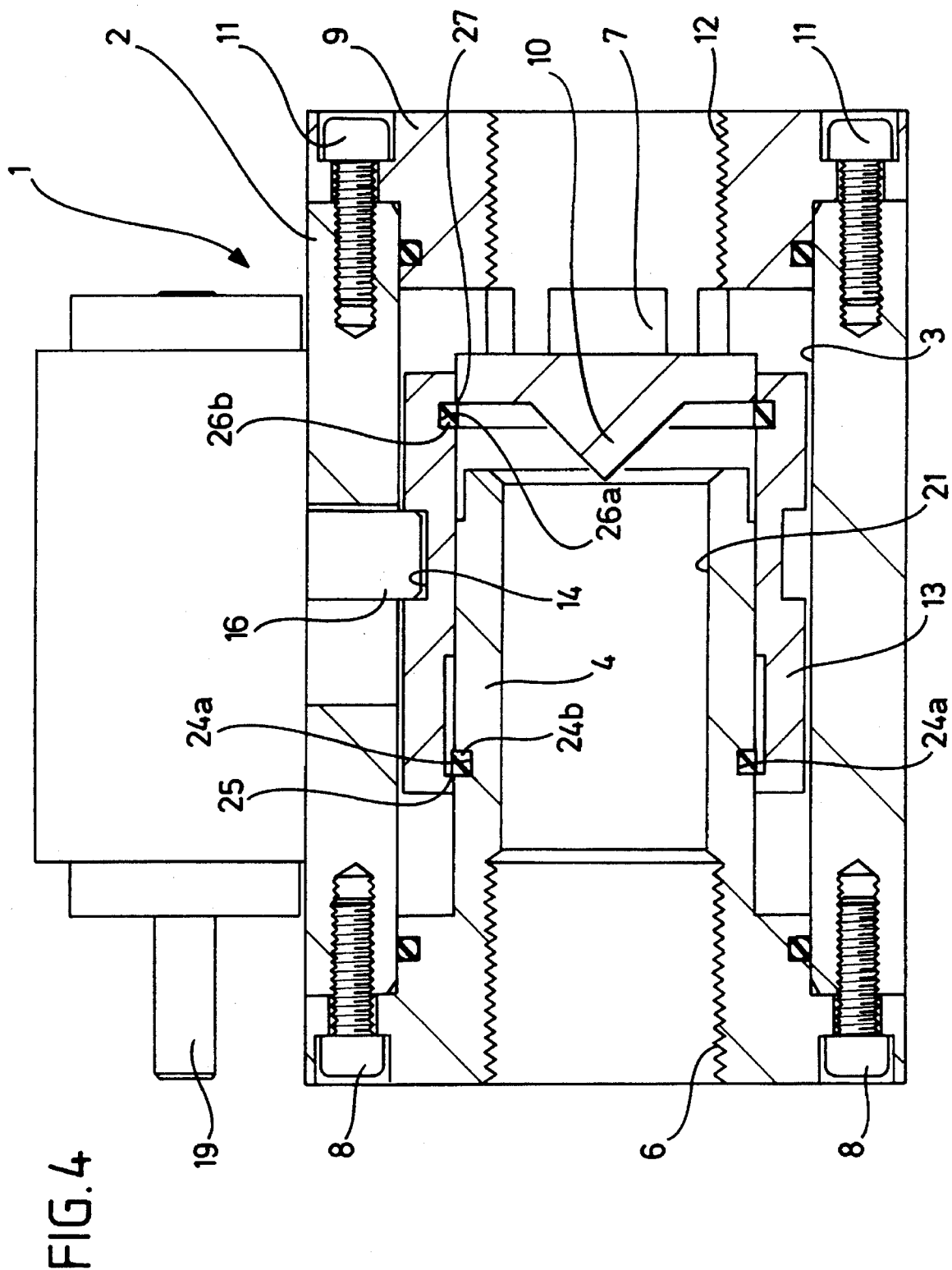
FIG. 4 is a sectional view of a second embodiment of an inventive valve in a closed position.

FIG. 4 shows a modified, second embodiment of a valve, in which the outlet regions 7 are modified in comparison with FIGS. 1–3 and the sealing edge 27 is not formed on the stationary inner member 4 as in FIGS. 1–3 but on a projecting part 10 of the likewise stationary cover plate 9. The outlet regions 7 are located between the part 10 and the cover plate 9. As for the rest, the valve according to FIG. 4 functions in the same way as that according to FIGS. 1–3.

In the embodiments according to FIGS. 1–3 and 4 a stationarily held ring seal 24b interacts with a respective movable sealing edge 25 provided on the control member 13 and a ring seal 26b movable together with the control member 13 interacts with a stationary sealing edge 27, whereby the stationary sealing edge 27 is formed in FIGS. 1–3 on the inlet member 4 and in the embodiment according to FIG. 4 on the part 10 of the cover plate 9.

Figure 5:
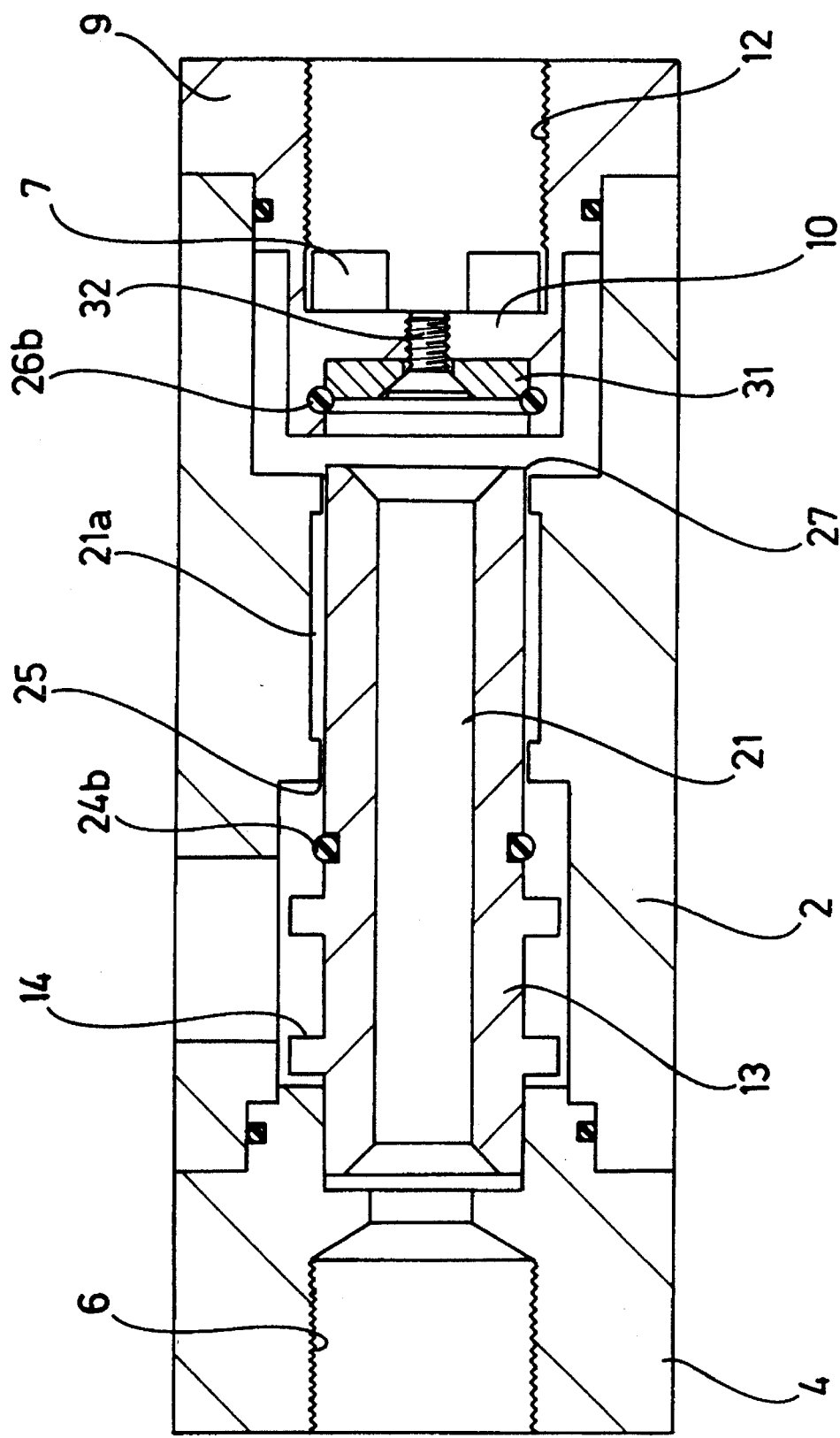
FIG. 5 is a sectional view of a third embodiment of an inventive valve in an open position.

The third embodiment of a valve illustrated in an open position in FIG. 5 differs from the two embodiments according to FIGS. 1–3 and 4 in that the first sealing ring 24b is formed on the outer side of the control member 13 and is movable together with it. The sealing ring 24b interacts with a first sealing edge 25 stationarily formed on the inner side of the valve housing 2.

The second sealing ring 26b is stationarily arranged on the projecting part 10 of the cover plate 9 and interacts with a second sealing edge 27 formed on the displaceable control member 13 at its end. A washer 31 which is firmly held in the part 10 by a screw 32 holds the sealing ring 26b in an associated annular groove in the part 10. As for the rest, the embodiment according to FIG. 5 functions in the same manner as the embodiments according to FIGS. 1–4.

Figure 6:
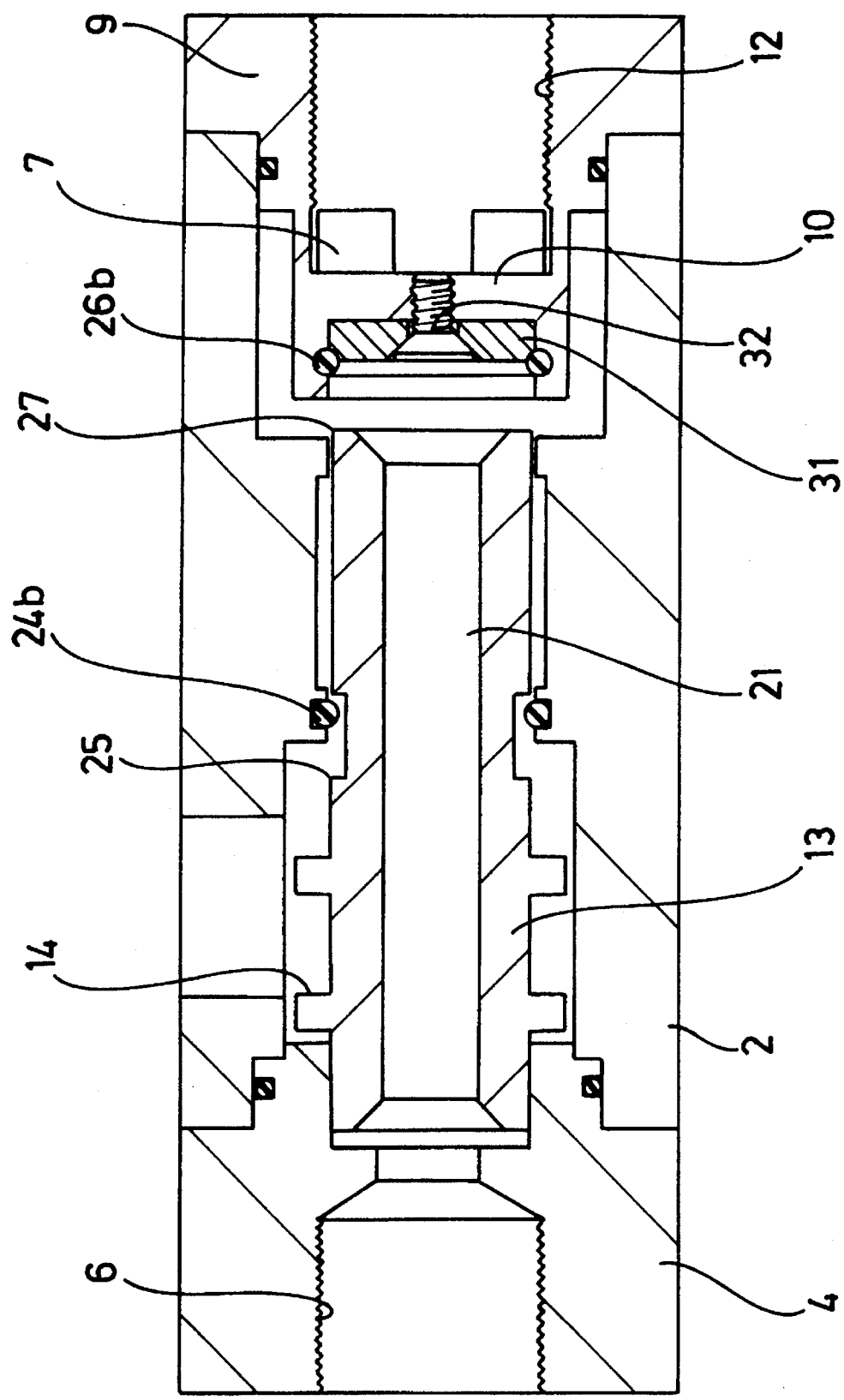
FIG. 6 is a sectional view of a fourth embodiment of an inventive valve in an open position.
Figure 7:
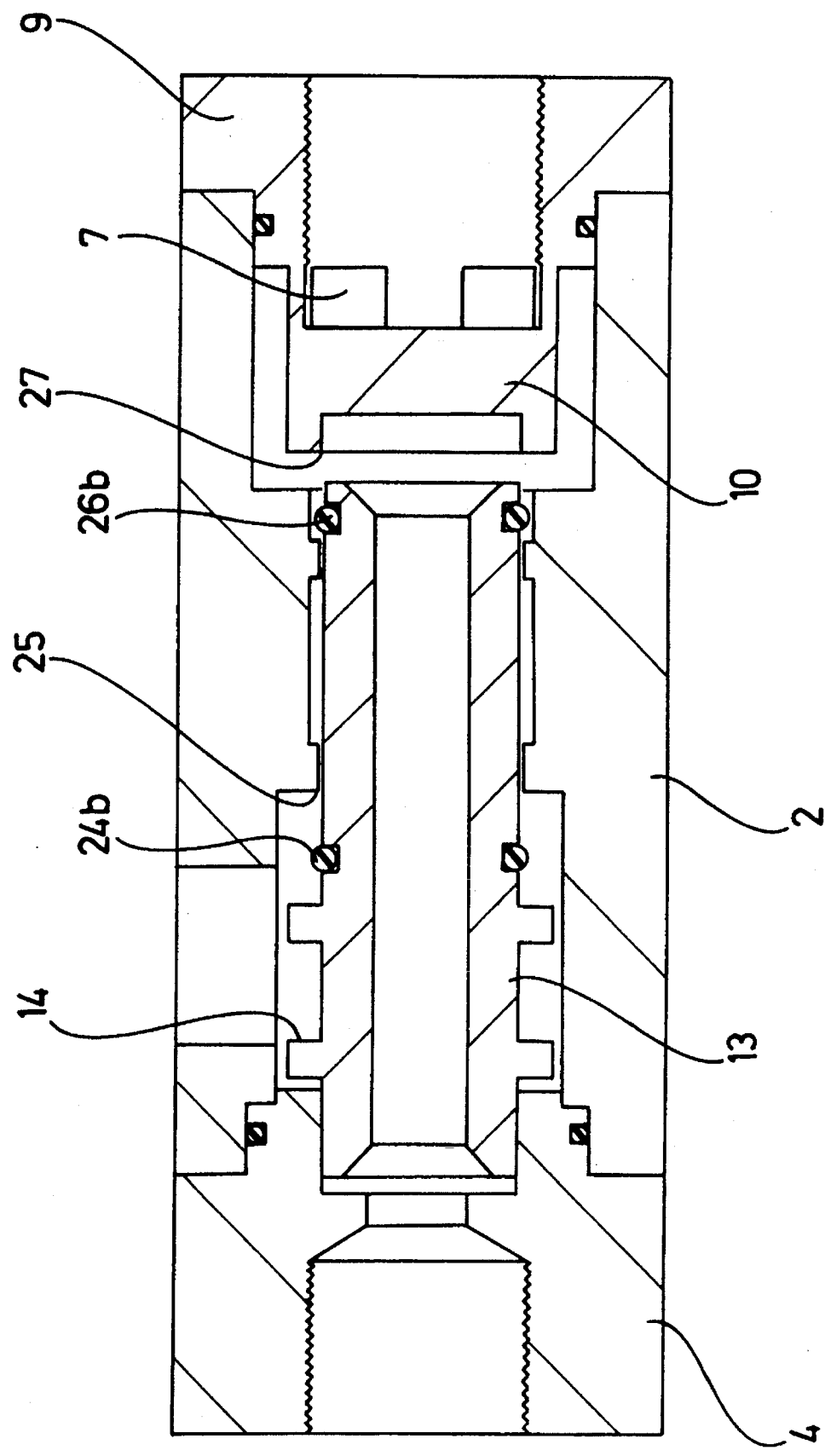
FIG. 7 is a sectional view of a fifth embodiment of an inventive valve in an open position.

In the additional embodiments of valves, as illustrated in an open position in FIGS. 6 and 7, parts which correspond with one another have been designated with the same reference numerals as in FIGS. 1–5. However, whereas in FIGS. 1–5 a stationary sealing ring (e.g. the sealing ring 26b in FIG. 5) and a sealing ring movable with the control member 13 (e.g. in FIG. 5 the sealing ring 24b) are provided each time and these interact with respective movable or stationary sealing edges (in FIG. 5 the sealing edges 27 and 25, respectively), in the embodiments according to FIGS. 6 and 7 the first and second sealing rings 24b, 26b are arranged so as to be either stationary or movable together such that they interact with sealing edges 25, 27 which are, for their part, either movable together or stationary.

In FIG. 6, the first and second sealing rings 24b, 26b are held in corresponding annular grooves of the valve housing 2 and the part 10 of the cover plate 9, respectively, so as to be stationary, i.e. non-displaceable. These sealing rings 24b, 26b interact with control edges 25 and 27, respectively, which are formed on the control member 13 in the illustrated manner and are movable together with it.

Finally, in the embodiment according to FIG. 7 first and second sealing rings 24b, 26b, which are formed on the control member 13 and movable together with it, interact with first and second sealing edges 25, 27, which are formed stationarily on the valve housing 2 and on the projecting part 10 of the cover plate 9, respectively.

FIGS. 6 and 7 show the valve in an open position. The valve is transferred into a closed position in that the control member 13 is displaced each time to the right in these Figures until the sealing edges 25, 27 abut sealingly on the sealing rings 24b and 26b, respectively. As for the rest, the embodiments according to FIGS. 6 and 7 function in the same manner as the embodiments according to FIGS. 1–4. In particular, a projection 16 which is, for example, driven by a motor can, in turn, engage in the groove 14 of the control member 13 in FIGS. 5–7 as well. In the embodiments according to FIGS. 5–7 the control member 13 is guided only on one side in the inlet member 4. In this case, parts of the inner side of the valve housing 2 serve for additional guidance of the control member 13.

Due to the different arrangement of the sealing rings 24a, 26a, there is a further difference between the embodiments according to FIGS. 1 to 4, on the one hand, and 5 to 6, on the other hand: In the embodiments according to FIGS. 1 to 4, there is no connection between the inlet opening 6 and the space 22 containing the drive member 16 in the closed state of the valve because such a connection is prevented by the seal 24a. In the embodiments according to FIGS. 5 to 6, on the other hand, such a connection does exist past the control member 13 in the closed state of the valve, as can be easily verified on the basis of FIGS. 5 to 7.

I claim:

1. Valve (1) for controlling a fluid medium flowing under pressure, comprising inlet openings (6) and outlet openings, an inlet member (4) having the medium flowing axially therethrough, a sleeve-shaped control member (13) axially displaceable between a closed and an open position in relation to the inlet member (4), a first radially projecting, elastic sealing ring (24b) and a first annular sealing edge (25) adapted to be pressed sealingly against the first sealing ring (24b) in the closed position of the control member (13), whereby the displaceable control member (13) is enclosed by a valve housing (2) and the space between the control member (13) and valve housing (2) is acted upon with the fluid medium flowing under pressure so that essentially no resulting pressure in axial direction is present at the control member (13) and therefore the control member is displaceable without any appreciable expenditure of force, a second radially projecting, elastic sealing ring (26b) is provided in axial spaced relation to the first sealing ring (24b) and a second annular sealing edge (27) is adapted to be pressed sealingly against the second sealing ring (26b) in the closed position of the control member (13), characterized in that the first and second annular sealing edges (25, 27) are designed to be relatively sharp and like knife edges and in a closed position of the valve form a sealing region in the form of a circular line between the first and second sealing rings (24b, 26b), on the one hand, and the first and second sealing edges (25, 27), on the other hand.

2. Valve as defined in claim 1, characterized in that of the two sealing rings (24b, 26b) on the valve (1) one (24b) is designed to be stationary and the other (26b) to be movable together with the control slide (13), and a sealing edge (25) movable together with the control slide (13) is associated with the stationary sealing ring (24b) and a stationary sealing edge (27) with the movable sealing ring (26b) (FIGS. 1–3; 4; 5).

3. Valve as defined in claim 2, characterized in that the first sealing ring (24b) is formed stationarily on the inlet member (4), the first sealing edge (25) is formed on the displaceable control member (13), the second sealing ring (26b) on the displaceable control member (13) and the second sealing edge (27) stationarily on the inlet member (4) (FIGS. 1–3).

4. Valve as defined in claim 2, characterized in that the first sealing ring (24b) is formed stationarily on the inlet member (4), the first sealing edge (26) is formed on the displaceable control member (13), the second sealing ring (26b) on the displaceable control member (13) and the second sealing edge (27) stationarily on a cover plate (9) connected to the valve housing (2) and enclosing the outlet opening (12) (FIG. 4).

5. Valve as defined in claim 2, characterized in that the first sealing ring (24b) is formed on the displaceable control member (13), the first sealing edge (25) on the valve housing (2), the second sealing ring (26b) stationarily on a cover plate (9) connected to the valve housing (2) and enclosing the outlet opening (2) and the second sealing edge (27) on the displaceable control member (13) (FIG. 5).

6. Valve as defined in claim 1, characterized in that the two sealing rings (24b, 26b) are formed stationarily on the valve (1) and a sealing edge (25, 27) movable together with the control slide (13) is associated with each sealing ring (24b, 26b) (FIG. 6).

7. Valve as defined in claim 1, characterized in that the two sealing rings (24b, 26b) are designed to be movable together with the control slide (13), and a stationary sealing edge (25, 27) is associated with each sealing ring (24b, 26b) (FIG. 7).

8. Valve as defined in claim 1, characterized in that in a space (21a) filled with fluid medium and limited at its ends by the sealing rings (24b, 26b) the two sealing rings (24b, 26b) are adapted to be pressed sealingly against their associated sealing edges (25, 27) essentially simultaneously in the closed position.

9. Valve as defined in claim 1, characterized in that the sealing rings (24b, 26b) are arranged in circumferential grooves (24a, 24b) so as to protrude radially.

10. Valve as defined in claim 1, characterized in that the sealing rings (24b, 26b) are O-rings having an at least partially round cross-sectional shape.

11. Valve as defined in claim 1, characterized in that the sealing rings (24b, 26b) are O-rings having an at least partially angular cross-sectional shape.

12. Device as defined in claim 1, characterized in that the sealing rings (24b, 26b) are designed as annular plastic projections.

13. Device as defined in claim 1, characterized in that a groove (14) extending in circumferential direction is arranged in the outer circumferential surface of the sleeve-shaped control member (13), a drive member (16) for displacing the control member (13) engaging in said groove.

* * * * *